United States Patent
Shimura et al.

(10) Patent No.: US 8,118,128 B2
(45) Date of Patent: Feb. 21, 2012

(54) CANISTER-HOLDING STRUCTURE FOR SUPPORTING A CYLINDRICAL CANISTER IN A VEHICLE

(75) Inventors: Takeshi Shimura, Saitama (JP); Hideo Nihei, Saitama (JP); Iwao Takaku, Saitama (JP); Takeji Kawazumi, Saitama (JP); Takashi Udono, Saitama (JP); Takashi Yamamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 297 days.

(21) Appl. No.: 12/584,604

(22) Filed: Sep. 9, 2009

(65) Prior Publication Data

US 2010/0065362 A1 Mar. 18, 2010

(30) Foreign Application Priority Data

Sep. 16, 2008 (JP) .................................. 2008-237212

(51) Int. Cl.
*B62K 11/02* (2006.01)
(52) U.S. Cl. ........................................ 180/219; 180/68.4
(58) Field of Classification Search .................. 248/313, 248/311.2, 231.71, 224.61; 123/519; 60/299; 224/413; 285/242; 180/218, 219, 68.4, 68.5; D9/517
See application file for complete search history.

(56) References Cited

U.S. PATENT DOCUMENTS

| | | | |
|---|---|---|---|
| 5,098,054 A | 3/1992 | Dyer | |
| 7,490,805 B2 * | 2/2009 | Krall | 248/311.2 |
| 2007/0186904 A1 * | 8/2007 | Braithwaite et al. | 123/434 |
| 2010/0051369 A1 * | 3/2010 | Kuramochi et al. | 180/69.4 |
| 2010/0078241 A1 * | 4/2010 | Maeda et al. | 180/68.3 |
| 2010/0163328 A1 * | 7/2010 | Hasegawa | 180/225 |
| 2010/0206653 A1 * | 8/2010 | Koike | 180/225 |
| 2010/0243354 A1 * | 9/2010 | Inaoka | 180/69.4 |
| 2010/0243358 A1 * | 9/2010 | Suzuki | 180/219 |
| 2010/0243360 A1 * | 9/2010 | Inaoka | 180/225 |
| 2011/0024214 A1 * | 2/2011 | Seki et al. | 180/69.4 |
| 2011/0073399 A1 * | 3/2011 | Seki | 180/219 |
| 2011/0120796 A1 * | 5/2011 | Kuramochi et al. | 180/219 |

FOREIGN PATENT DOCUMENTS

| | | |
|---|---|---|
| DE | 32 01 135 A1 | 7/1983 |
| EP | 0 466347 A2 | 1/1992 |
| JP | 04-042515 | 10/1992 |
| JP | 7-083210 A | 3/1995 |

* cited by examiner

*Primary Examiner* — Tony H. Winner
(74) *Attorney, Agent, or Firm* — Carrier Blackman & Associates, P.C.; William D. Blackman; Joseph P. Carrier

(57) ABSTRACT

A canister holding structure for mounting an evaporative emissions canister, having a cylindrical body portion, to a vehicle body. A central axis of the cylindrical body portion extends in a direction other than perpendicular to a ground surface. The canister holding structure includes a holding member, including an annular portion which substantially surrounds the cylindrical body portion of the canister, and a fixing portion for attaching to the vehicle body. Positioning structure is provided for positioning the canister in relation to the holding member. The positioning structure is provided to both the annular portion and the canister. In one illustrative embodiment, the positioning structure includes at least one projection provided on a periphery of the cylindrical body portion of the canister, and multiple holes provided in the annular portion of the holding member, where each of the multiple holes is engageable with the projection.

20 Claims, 12 Drawing Sheets

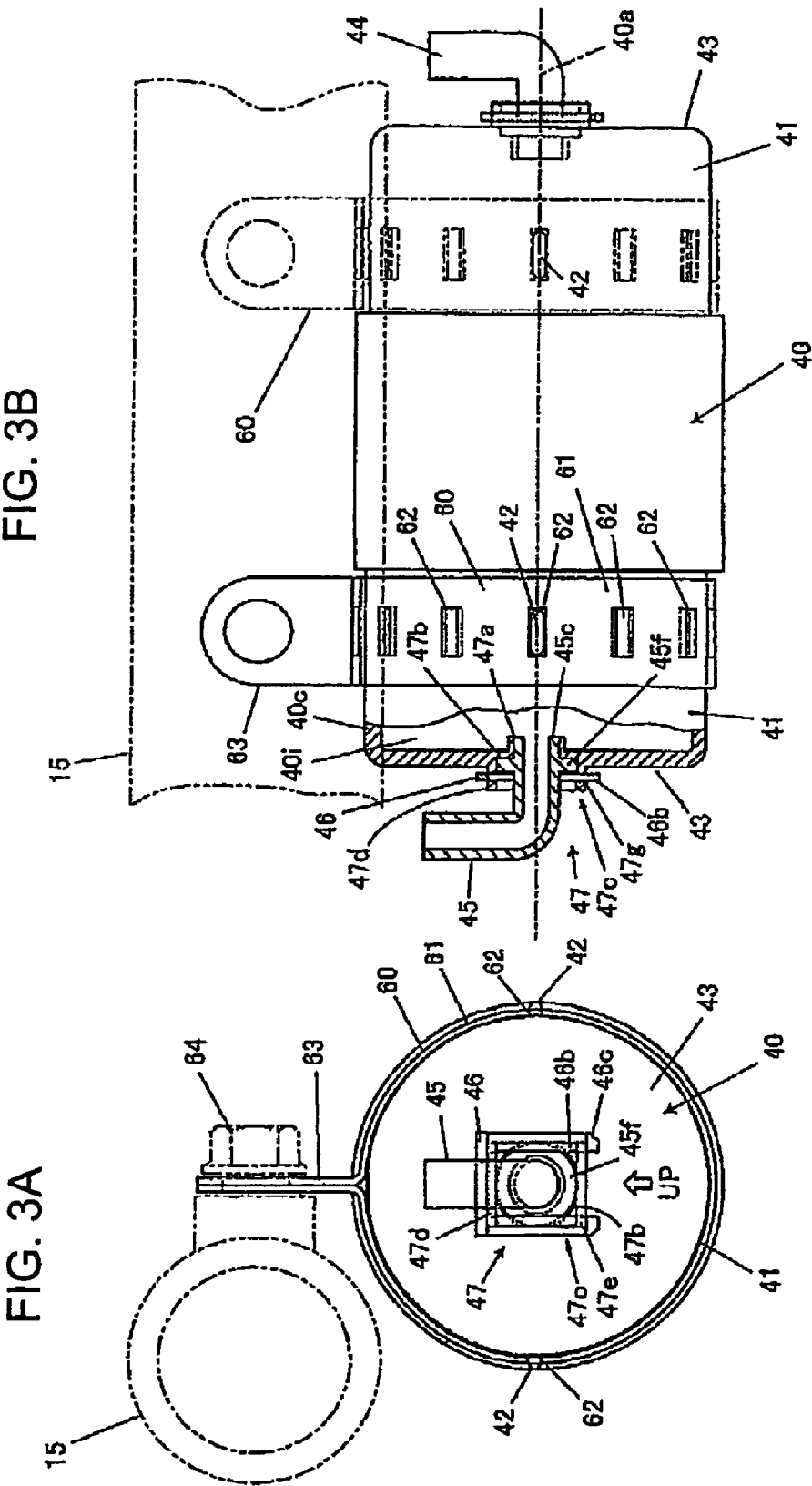

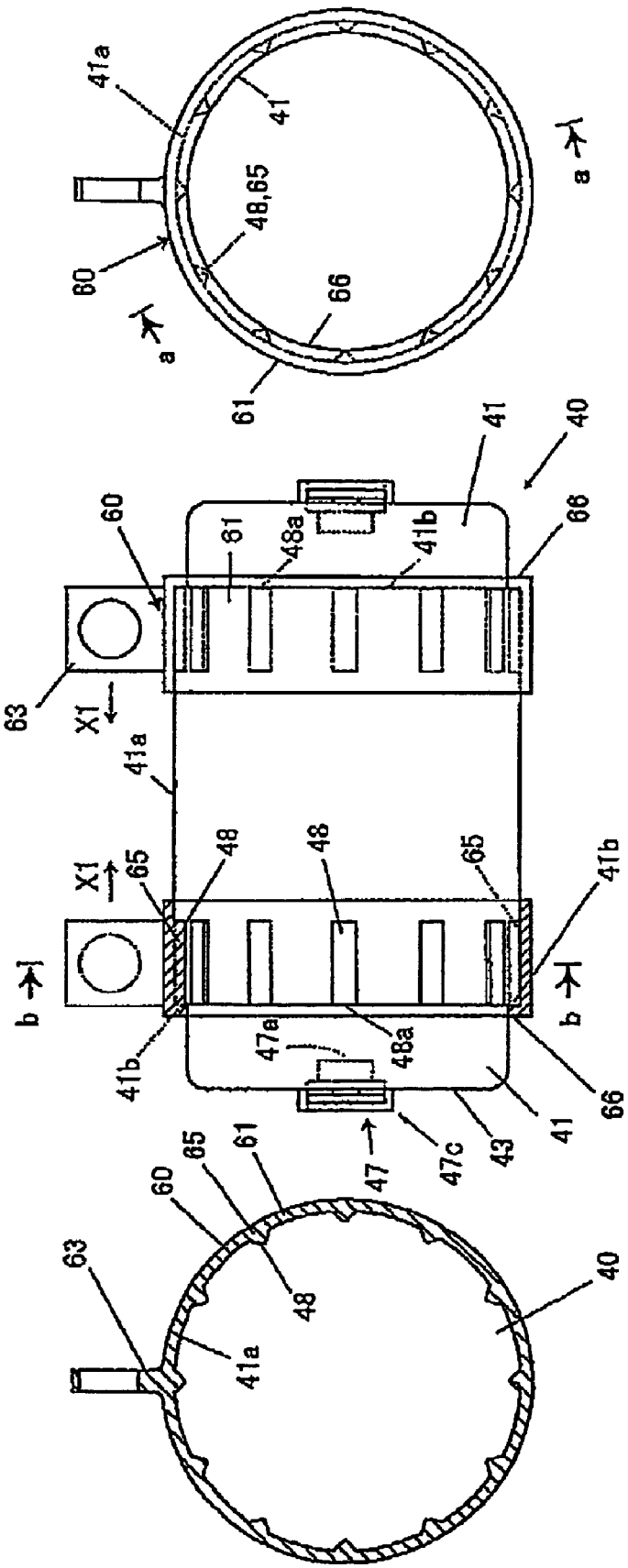

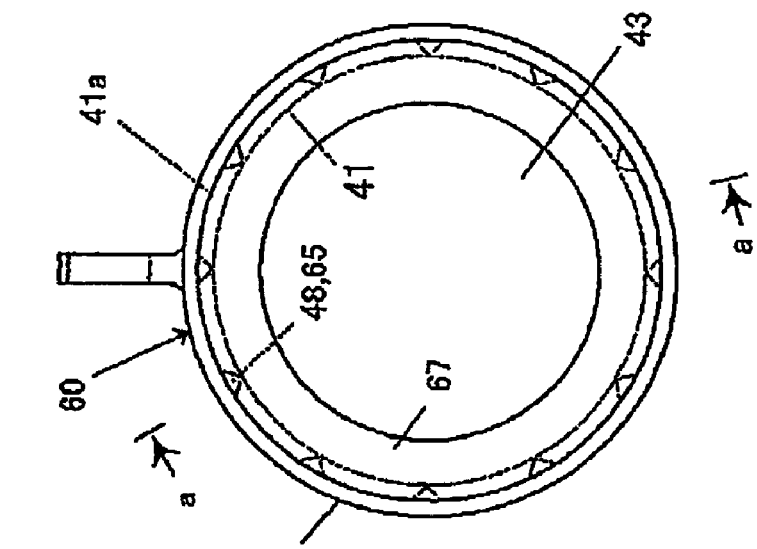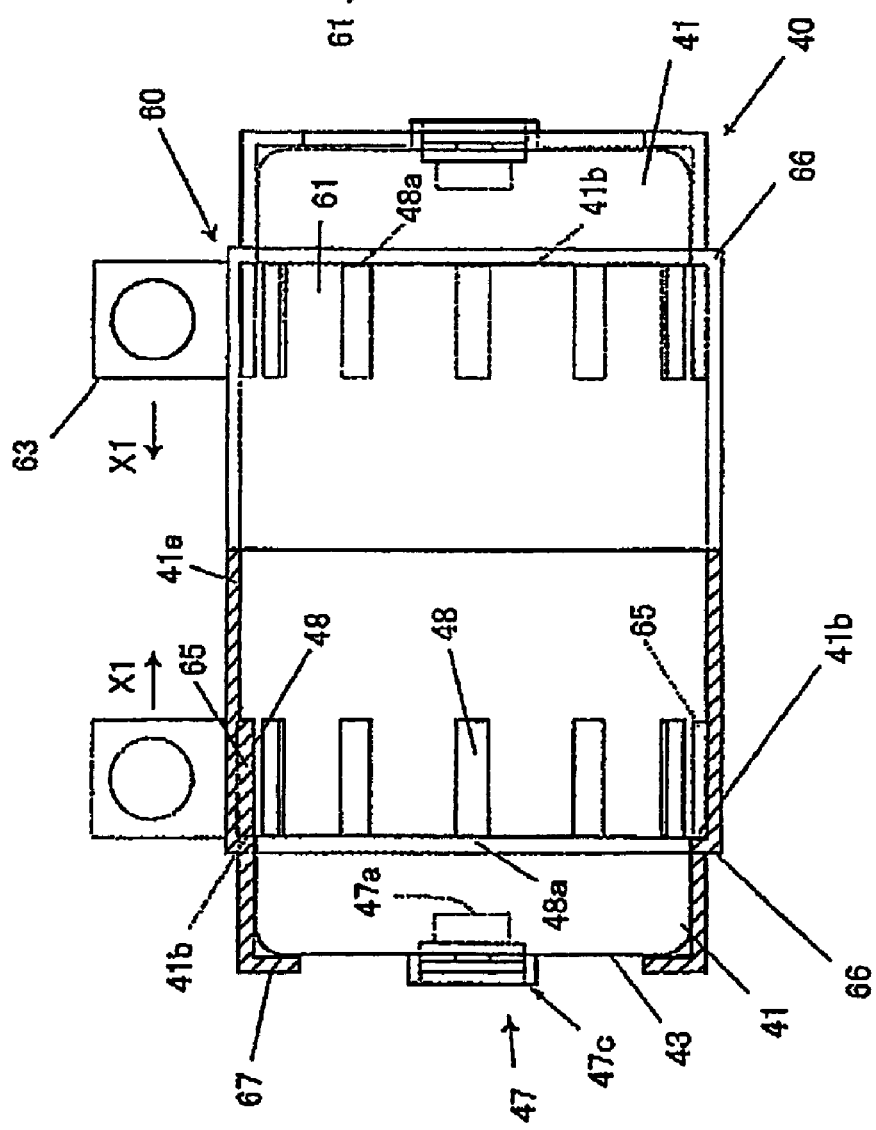

FIG. 10A
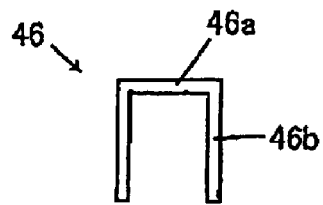
FIG. 10B
FIG. 10C
FIG. 10D
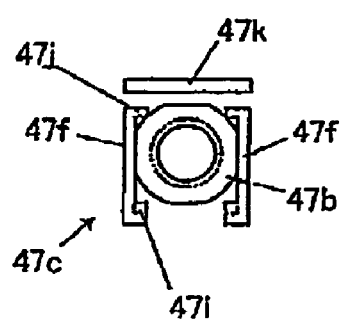
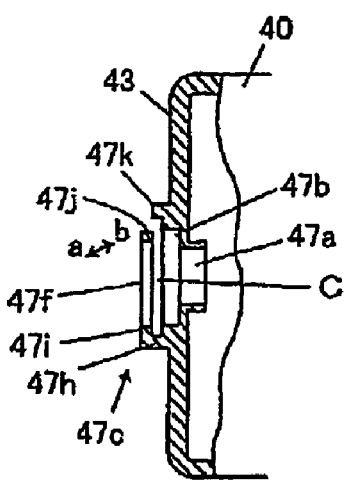
FIG. 10E
FIG. 10F
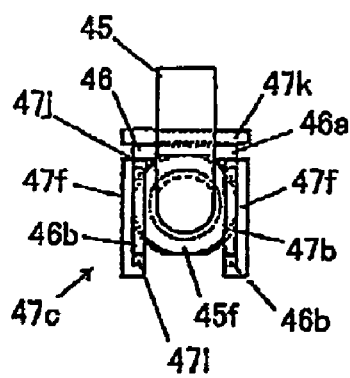
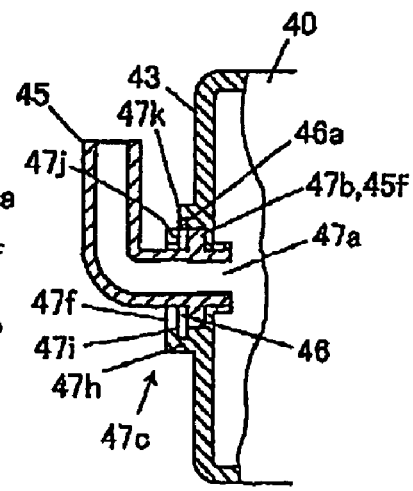

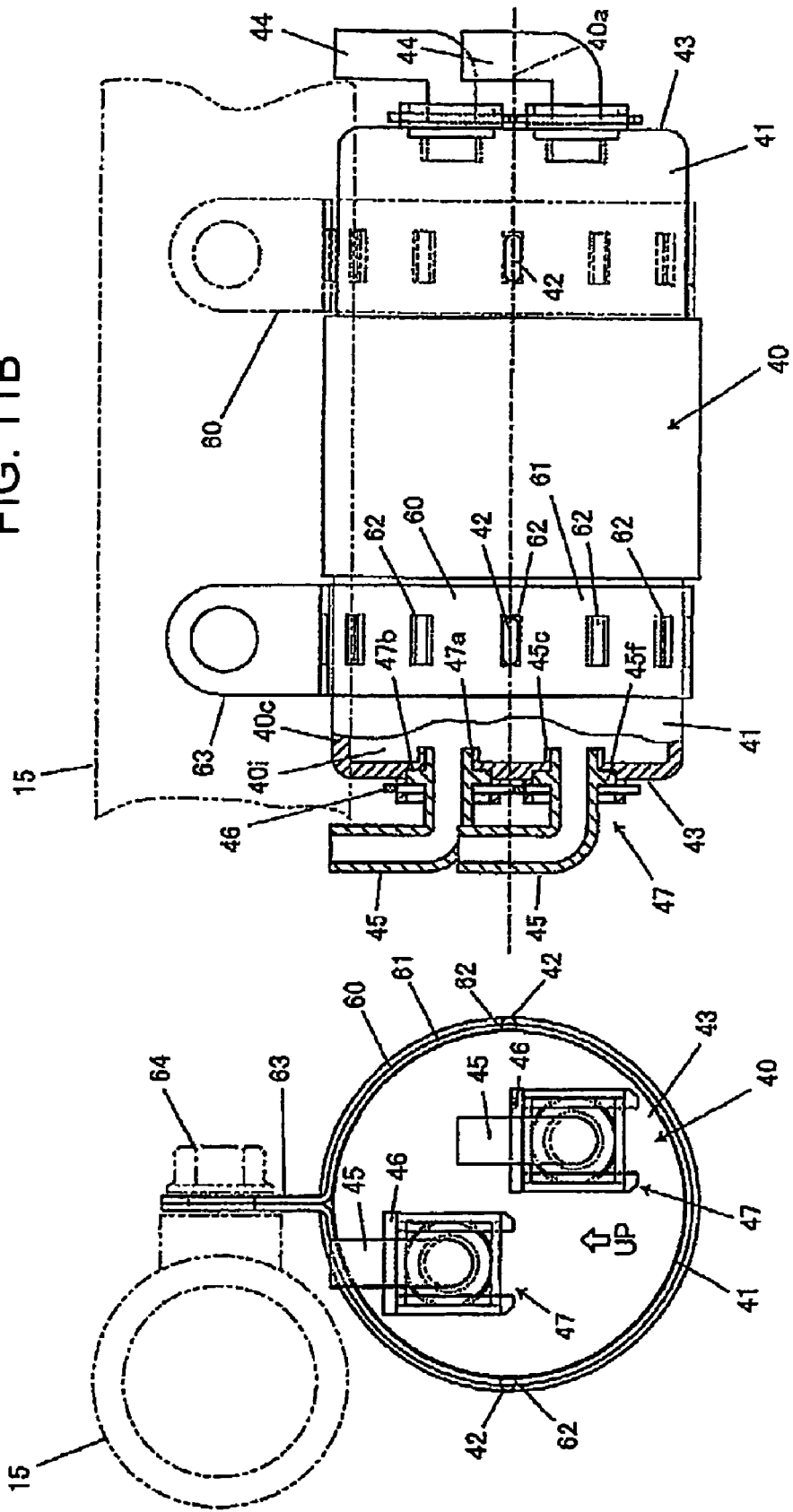

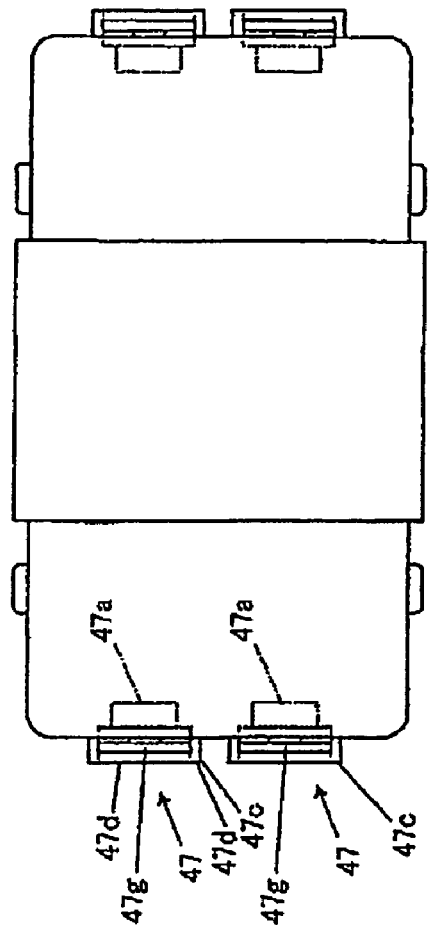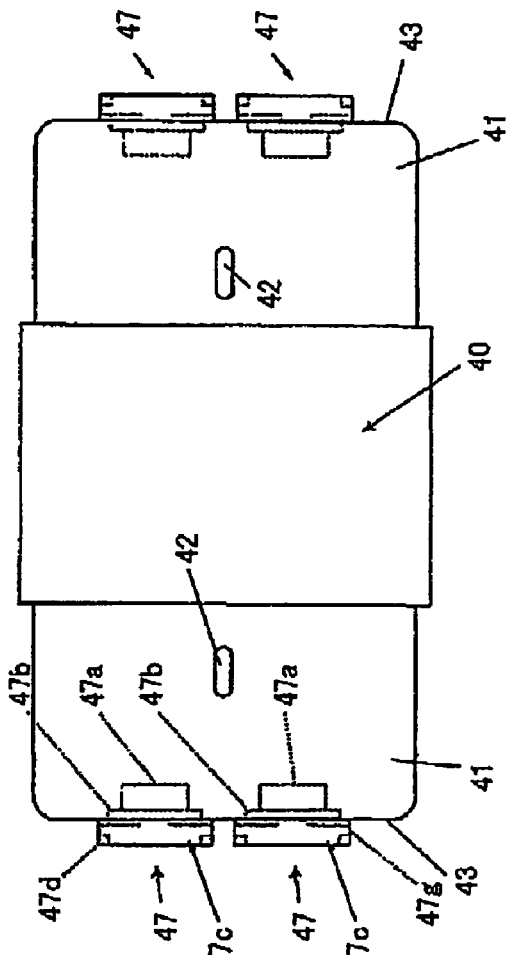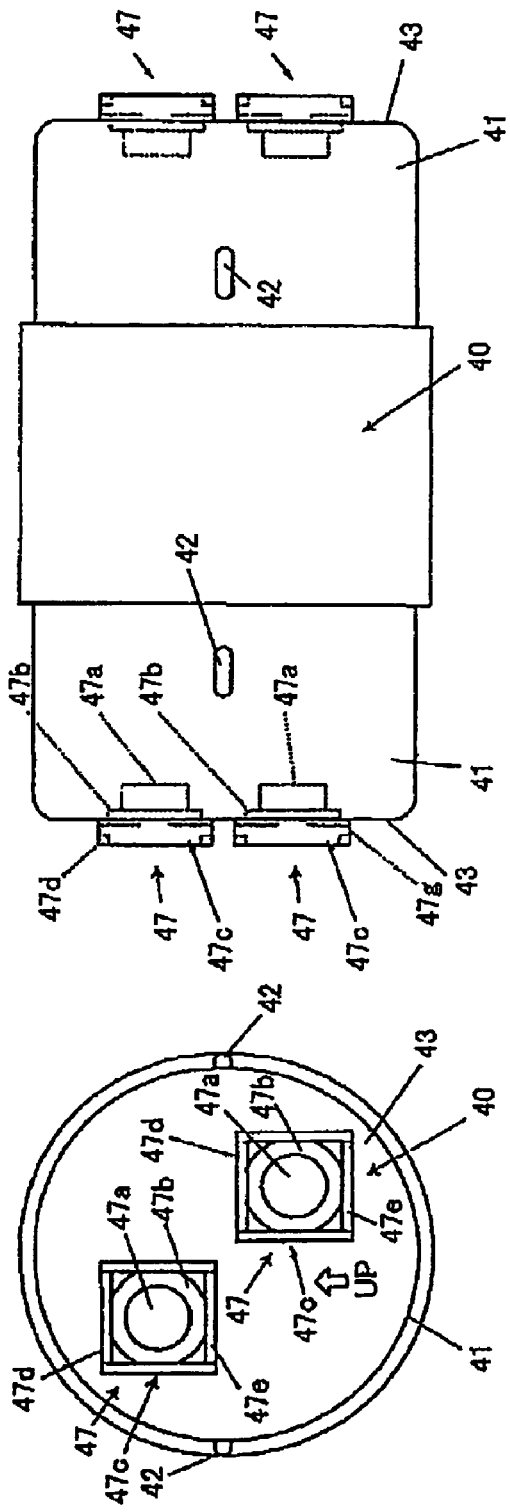
FIG. 12C
FIG. 12B
FIG. 12A

CANISTER-HOLDING STRUCTURE FOR SUPPORTING A CYLINDRICAL CANISTER IN A VEHICLE

CROSS-REFERENCE TO RELATED APPLICATIONS

The present invention claims priority under 35 USC 119 based on Japanese patent application No. 2008-237212, filed on Sep. 16, 2008. The entire subject matter of this priority document, including the specification, claims and drawings thereof, is incorporated by reference herein.

BACKGROUND OF THE INVENTION

1. Field of the Invention

The present invention relates to a canister holding structure. More specifically, the present invention relates to a structure for holding an evaporative emissions filtration canister to a vehicle body of a vehicle equipped with a gasoline engine, the canister being provided between a fuel tank and the engine so as to reduce or prevent evaporation of gasoline fuel.

2. Description of the Background Art

Evaporative emissions systems have been standard equipment in vehicles for a number of years. Accordingly, a number of evaporative emissions filtration canisters are known for use in vehicles. Some support structures for evaporative emissions canisters are also known. Some of the known canisters have a cylindrical shape, and have directivity in a direction orthogonal to an axial direction of the cylindrical shape. In other words, some of the known canisters need to be mounted in a given posture with respect to the axis. For example, a canister disclosed in Patent Document 1 needs to be mounted transversely to a vehicle body (that is, in such a manner that the above-mentioned axis is directed in any direction other than the direction perpendicular to a ground surface) so that an air intake (42) is located, below a center line (C) of the casing, at the bottommost end of a casing.

Meanwhile, a mounting portion (for example, a mounting surface) to mount such a canister is often different between vehicles of different types. In such an instance, preparing a canister for each type of vehicle is undesirable because this leads to a rise in cost.

In this respect, a canister holding structure disclosed in Patent Document 1 is provided with three fixing portions (32, 35, 36) every 90° on the periphery of a cylindrical body portion, so that the same canister can be mounted to any one of the bottom surface, the side surface, and the top surface no matter which surface the canister is to be mounted.

[Patent Document 1] Japanese Examined Utility Model Publication No. Hei 04-042515

Being provided with the large fixing portions (32, 35, 36) on the periphery of the cylindrical body portion, the conventional canister holding structure mentioned above presents the following problem. If the canister is to be reduced in size, the provision of the multiple fixing portions becomes difficult. Conversely, if the multiple fixing portions are to be provided, the canister needs to be large in size.

Also, for enhancement of the degree of flexibility in mounting a canister, it is desired that the number of fixing portions be increased to permit the canister to be mounted at various angles; however, because of the large size of the fixing portions, the conventional canister holding structure also presents a problem of difficulty in increasing the number of fixing portions, and in turn, difficulty in achieving the enhancement of the degree of flexibility in mounting.

An object of the present invention is to solve the foregoing problems and thereby provide a canister holding structure capable of achieving both the canister size reduction and the enhancement of the degree of flexibility in mounting.

SUMMARY OF THE INVENTION

In order to achieve the above objects, and for the purpose of solving the aforementioned problems, an aspect of the present invention provides a canister holding structure characterized as follows. The canister holding structure of the present invention is a canister holding structure for mounting, to a vehicle body, a canister having a cylindrical shape and having directivity in a direction orthogonal to an axial direction of the cylindrical shape, in such a manner that an axis of the cylindrical shape is directed in any direction other than a direction perpendicular to a ground surface. The canister holding structure includes a holding member for holding the canister, the holding member including an annular portion which surrounds the circumference of a cylindrical body portion of the canister and a fixing portion which is to be fixed to the vehicle body; and positioning structure for positioning the canister at a predetermined position, the positioning structure provided to the annular portion and the canister. The positioning structure includes at least one projection provided on a periphery of the cylindrical body portion of the canister; and multiple holes provided in the annular portion of the holding member, each of the multiple holes being engageable with the projection.

According to the canister holding structure, the positioning of the canister at the predetermined position can be accomplished by selectively engaging the multiple holes provided in the annular portion of the holding member with the projection provided on the periphery of the cylindrical body portion of the canister, and the mounting of the canister to the vehicle body in a predetermined posture can be accomplished by fixing the fixing portion of the holding member to the vehicle body.

According to the canister holding structure, then, the positioning structure includes the projection provided on the periphery of the cylindrical body portion of the canister, and the multiple holes each engageable with the projection, provided in the annular portion of the holding member. This enables size reduction of the projection and also enables an increase in the number of holes provided in the annular portion.

According to the canister holding structure, therefore, both the canister size reduction and the enhancement of the degree of flexibility in mounting can be achieved.

Moreover, for the purpose of solving the aforementioned problems, an aspect of the present invention provides a canister holding structure characterized as follows. In the canister holding structure, the positioning structure includes multiple recesses provided in a periphery of the cylindrical body portion of the canister, and a projection provided on the annular portion of the holding member and being engageable with any one of the recesses.

According to the canister holding structure, the positioning of the canister at the predetermined position can be accomplished by selectively engaging the projection provided on the annular portion of the holding member in the multiple recesses provided in the periphery of the cylindrical body portion of the canister, and the mounting of the canister to the vehicle body in a predetermined posture can be accomplished by fixing the fixing portion of the holding member to the vehicle body.

According to the canister holding structure, then, the positioning structure is configured of the multiple recesses provided in the periphery of the cylindrical body portion of the canister, and the projection engageable with any one of the recesses, provided on the annular portion of the holding member. This enables size reduction of the projection (and hence the recess) and also enables an increase in the number of recesses provided in the periphery of the cylindrical body portion of the canister.

According to the canister holding structure, therefore, both the canister size reduction and the enhancement of the degree of flexibility in mounting can be achieved.

Desirably, a large-diameter portion is provided to the periphery of the cylindrical body portion of the canister, and the recesses are provided to the large-diameter portion. A stopper portion is provided to the annular portion of the holding member, the stopper portion engaging with an end face portion of the large-diameter portion in its axial direction thereby to restrict relative movement between the canister and the holding member in the axial direction, when the projection provided on the annular portion engages with one of the recesses.

This configuration eliminates the need for additional restricting structure for restricting the relative movement between the canister and the holding member in the axial direction, besides the large-diameter portion provided with the recesses that form the positioning structure, and the annular portion.

Therefore, restriction of the relative movement between the canister and the holding member in the axial direction can be achieved without having to increase the number of components.

Further, desirably, the large-diameter portion is provided in a central portion of the cylindrical body portion of the canister in the axial direction. Moreover, the recesses are provided in both end portions of the large-diameter portion in the axial direction. A pair of holding members that cover substantially half a circumferential surface of the cylindrical body portion with respect to the axial direction are attached to the cylindrical body portion on both sides in the axial direction.

This configuration eliminates the need for additional restricting structure for restricting the relative movement between the canister and the holding member in the axial direction, besides the large-diameter portion provided with the recesses that form the positioning structure, and the annular portion. At the same time, this configuration also enables using the annular portion to protect the circumferential surface of the cylindrical body portion of the canister.

Also, desirably, the projection (i.e., the projection provided on the canister or the annular portion) includes a single projection that is provided circumferentially.

This configuration enables simplification of the shape of the canister or the annular portion provided with the projection.

Alternatively, the projection includes multiple projections that are provided circumferentially.

With this configuration, multiple points of engagement for positioning the canister at the predetermined position are present on the periphery of the cylindrical body portion of the canister, thus enabling the firm fixing and positioning of the canister. Also, this configuration enables suppression of wobbling of the canister due to vibrations.

Also, desirably, a joint formed of a bent pipe to which piping is connected is rotatably provided at an end of the canister in the axial direction.

This configuration enables rotation of the joint according to the direction of the piping that is connected to the joint.

Therefore, this also eliminates the need for the preparation of canisters different in direction of bending of the joint formed of the bent pipe, according to the types of vehicles having different piping directions, thus achieving a further improvement in general versatility.

Also, desirably, the joint is provided with a flange portion that is connected to a through hole provided in the canister, and the canister is provided with: a retainer that engages with the flange portion so that the flange portion can come into intimate contact with the through hole; and a retainer holder that fixedly holds the retainer.

This configuration enables the use of a simple structure for rotatable connection of the joint to the canister.

Also, desirably, positioning of the joint with respect to a direction of its rotation is accomplished by coupling the piping to the joint, and by fixing the piping to the vehicle body.

This eliminates the need for a member designed specifically for fixing the joint.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 3A is front view, with parts omitted, of the holding structure for the canister.

FIG. 3B is side view, with parts omitted, of the holding structure for the canister.

FIGS. 8A, 8B and 8C, respectively, are a side view, with parts omitted, a cross sectional view, with parts omitted, taken along the line b-b of FIG. 8A, and an end view, with parts omitted, showing another embodiment of the holding structure for the canister.

FIGS. 9A and 9B, respectively, are a side view of another holding structure, with parts omitted, and an end view of the structure of FIG. 9A, with parts omitted, respectively, showing still another embodiment of the holding structure for the canister.

FIGS. 10A-10F illustrate a modified embodiment of another retainer and retainer holder according to the invention. FIG. 10A is a front view of the retainer; FIG. 10B is a side view thereof; FIG. 10C is a front plan view of the retainer holder; FIG. 10D is a sectional side view showing an end portion of the canister; FIG. 10E is a front plan view of the retainer holder with the joint and the retainer mounted therein; and FIG. 10F is a sectional side view showing an end portion of the canister.

FIGS. 11A and 11B, respectively, are a front view, with parts omitted, and a side view, with parts omitted, respectively, showing still another embodiment of the holding structure for the canister.

FIGS. 12A, 12B and 12C, respectively, are an end view, a side plan view, and a top plan view of showing the main body of the canister according to the embodiment of FIGS. 11A-11B.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Description will be given below with regard to embodiments of a canister holding structure according to the present invention with reference to the drawings.

Figure 1:
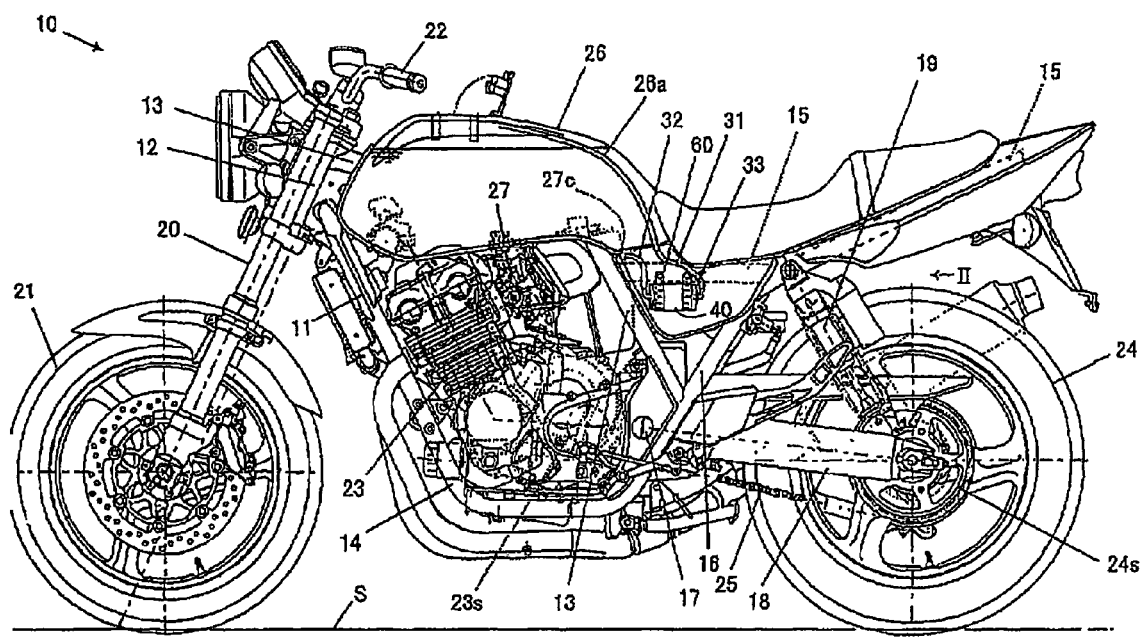
FIG. 1 is a side view, partially in perspective, of a motorcycle as an example of a vehicle to which one embodiment of a canister holding structure according to the present invention is applied.
Figure 2:
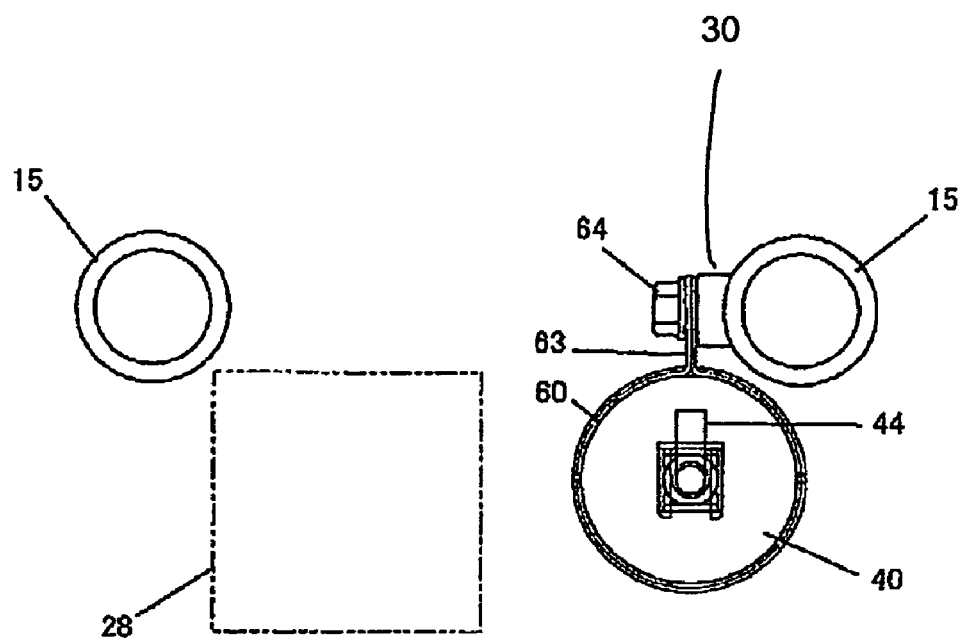
FIG. 2 is a view, with parts omitted, taken in the direction of arrow II of FIG. 1.

FIG. 1 is a side view, partially in perspective, of a motorcycle as an example of a vehicle to which one embodiment of the canister holding structure according to the present invention is applied. FIG. 2 is a rear plan view, with parts omitted, of an evaporative emissions canister and associated support structure, taken in a direction of the arrow II of FIG. 1.

As shown in FIG. 1, a motorcycle 10 includes a vehicle body frame 11. The vehicle body frame 11 includes a head pipe 12 provided at a front end of the vehicle, a main frame 13 extending rearwardly from the head pipe 12, and a pair of right and left down frames 14 extending obliquely downwardly from the head pipe 12. The vehicle body frame 11 also includes a pair of right and left rear frames 16 that link rear ends of the down frames 14 to a rear end of the main frame 13, and further includes a pair of right and left seat rails 15, which are operatively attached to the main frames 13 and to the rear frames 16.

A pivot shaft 17 is mounted to the pair of right and left rear frames 16, 16, and a rear fork 18 (also referred to as a swing arm) is pivotally mounted on the pivot shaft 17 so as to be swingable therearound in a vertical direction. The rear of the rear fork 18 and the above-mentioned seat rails 15 are linked by a pair of right and left rear shock absorbers 19.

A front fork 20 is steerably mounted to the head pipe 12, and a front wheel 21 is rotatably mounted at a lower end of the front fork 20. Steering handlebars 22 are mounted at the top of the front fork 20.

A gasoline-powered internal combustion engine (hereinafter called "engine") 23 is mounted on the down frames 14.

A rear wheel 24 is rotatably mounted at a rear end of the rear fork 18.

A chain 25 is looped around a follower sprocket 24s provided in the rear wheel 24 and a drive sprocket 23s provided on an output shaft of the engine 23, and the rear wheel 24 is driven by the engine 23, via the chain 25.

A fuel tank 26 is mounted on top of the main frame 13, and gasoline contained in the fuel tank 26 is fed through an oil feeding system (not shown) to the engine 23.

An intake system 27 is disposed in the rear of the engine 23, and air is supplied through the intake system 27 to the engine. An air cleaner 27c is provided at an upstream end of the intake system 27, and the air from which dust has been removed by the passage of the air through the air cleaner 27c is supplied to the engine 23.

A canister 40, for reducing or preventing evaporation of gasoline fuel, is provided between the fuel tank 26 and the engine 23. The canister 40 as employed in the embodiment is provided between the fuel tank 26 and the air cleaner 27c that forms the intake system 27 of the engine 23.

A ventilation pipe 26a is provided inside the fuel tank 26. The ventilation pipe 26a is provided to exhaust air, containing vaporized fuel, outwardly from the fuel tank 26, and is connected to an inlet of the canister 40 by piping 31. Also, an outlet of the canister 40 is connected to the air cleaner 27c by piping 32.

An internal structure itself of the canister 40 is a known structure. The canister 40 has a cylindrical shape and has directivity in a direction orthogonal to an axial direction of the cylindrical shape. In other words, the canister 40 has the directivity in view of its mounting direction.

Figure 4C:
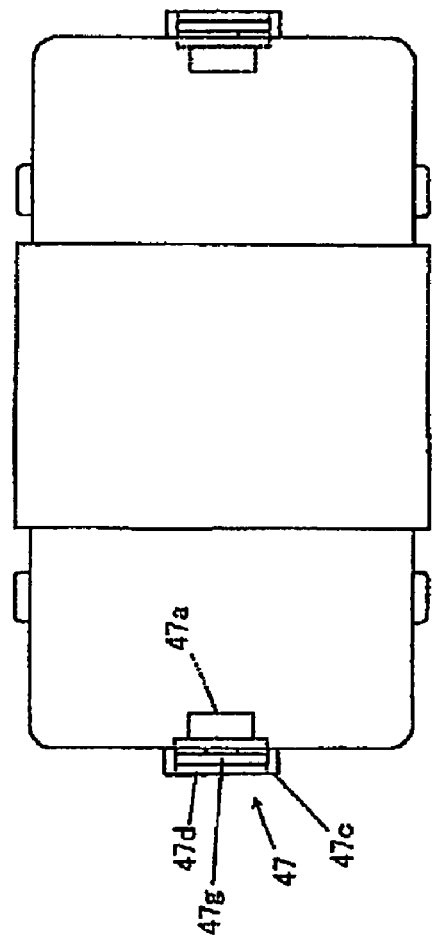
FIG. 4C is plan view of a main body of the canister.
Figure 4B:
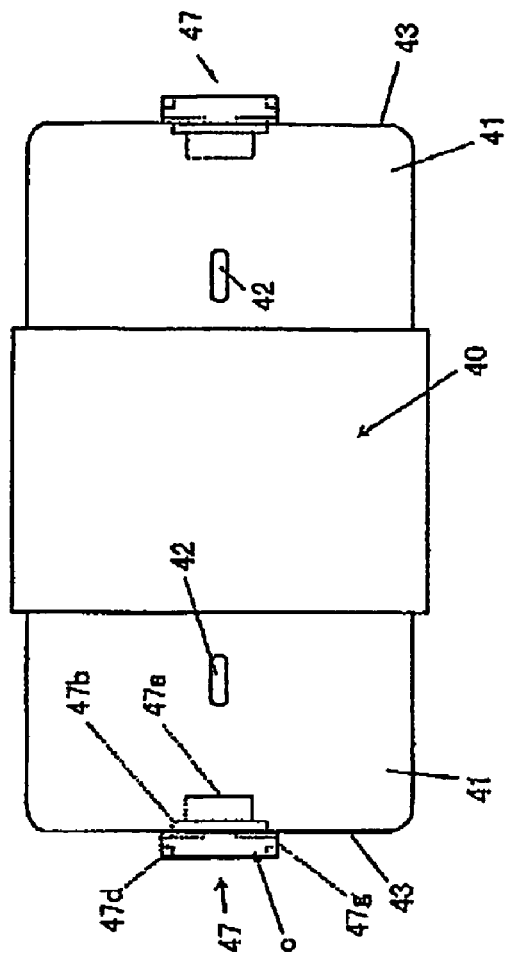
FIG. 4B is side view of a main body of the canister.
Figure 4A:
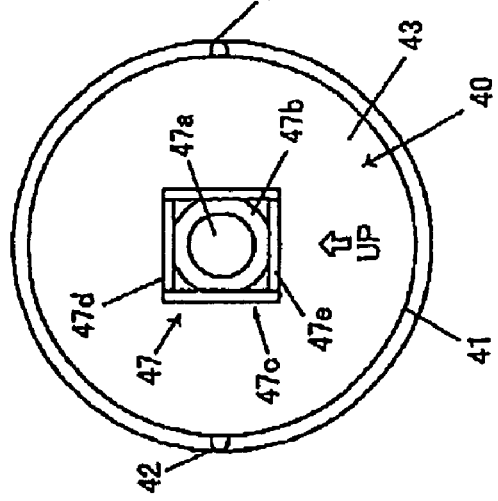
FIG. 4A is front view of a main body of the canister.

FIGS. 3A and 3B are a front view, with parts omitted, and a side view, with parts omitted, respectively, showing the canister 40 as well as the holding structure therefor. FIGS. 4A, 4B and 4C are a front view, a side view, and a plan view of a main body of the canister 40.

The holding structure for the canister 40 shown in FIG. 3 is provided for mounting the canister 40 to a vehicle body in such a manner that an axis 40a of the cylindrical shape is directed in a direction other than a direction perpendicular to a ground surface S (see FIG. 1). The canister-holding structure includes a holding member 60 for holding the canister 40, including an annular portion 61 which surrounds a cylindrical body portion 41 of the canister 40, and a fixing portion 63 which is configured to be fixed to the vehicle body; and positioning structure for positioning the canister 40 at a predetermined position, the positioning structure provided to the annular portion 61 and the canister 40. The positioning structure includes a projection 42 provided on a periphery of the cylindrical body portion 41 of the canister 40; and multiple holes 62 provided in the annular portion 61 of the holding member 60, each of the multiple holes 62 being engageable with the projection 42.

The canister 40 has a known internal structure in which activated carbon (not shown) is contained in an internal chamber 40i of a cylindrical casing 40c, and the canister 40 is provided to be mounted to the vehicle body in such a posture that an arrow with "UP" mark shown on a casing side 43 shown in FIG. 3A points upwardly in an installed configuration thereof.

As shown in FIGS. 4A-4C, in the embodiment, a respective projection 42 is provided at each of the left front, right front, left rear and right rear of the cylindrical body portion 41 of the canister 40, namely four projections 42 in total are provided on the exterior of the canister 40.

As shown in FIG. 3B, joints 44, 45 are each mounted to a central end portion of the canister body 40c with a respective retainer 46 so as to be rotatable about the axis of the canister 40 on each of ends (front and rear faces) 43, in the axial direction thereof, of the canister 40.

Figure 5A:
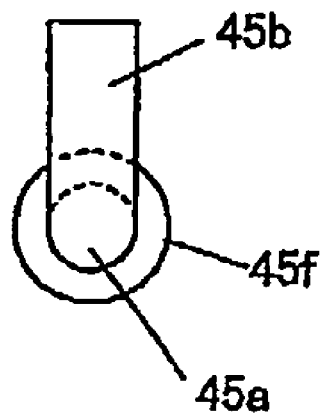
FIG. 5A is a front view of a joint.
Figure 5B:
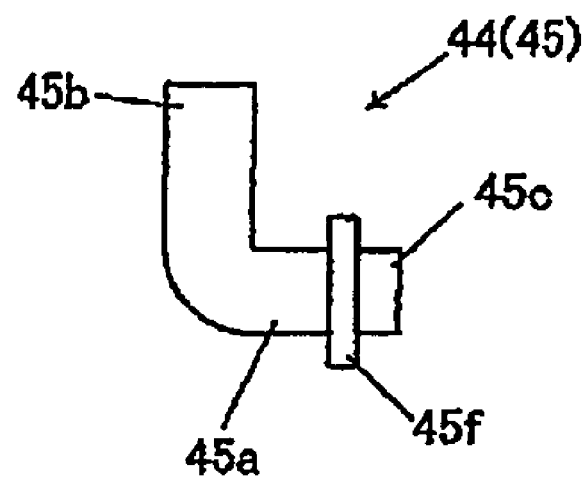
FIG. 5B is side view of the joint.

FIGS. 5A and 5B are a front view and a side view, respectively, showing a representative joint 45, which is identical to the joint 44.

Since the joints 44, 45 are identical to one another, one joint 45 will be described as a representative part therein.

The joint 45 is the joint formed of a bent pipe, and has a first pipe portion 45a extending in the axial direction of the canister 40, and a second pipe portion 45b extending from the first pipe portion 45a in a direction substantially orthogonal thereto. The first pipe portion 45a is provided integrally with a radially extending flange portion 45f.

Figure 6A:
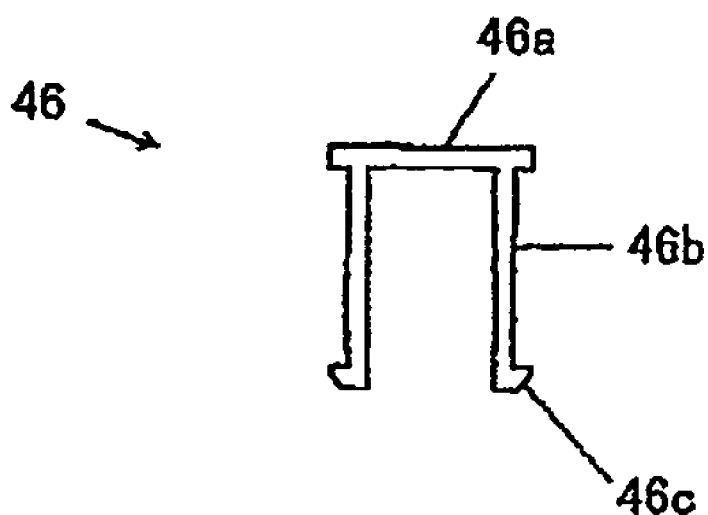
FIG. 6A is front view of a retainer.
Figure 6B:
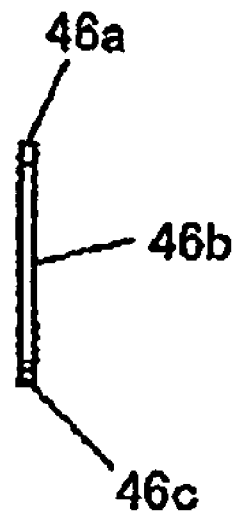
FIG. 6B is side view of the retainer of FIG. 6A.

FIGS. 6A and 6B are a front view and a side view, respectively, showing the retainer 46.

The retainer 46 is a member made of a material capable of elastic deformation, having a square U-shape as seen in a front view (such for example as a metallic spring member or a plastic spring member). The retainer 46 has a thumb portion 46a, and a pair of leg portions 46b integrally suspended from the thumb portion 46a. An outwardly projecting hook portion 46c is formed at the tip of each leg portion 46b, as shown.

Meanwhile, as shown in FIG. 3 and FIG. 4, mounting portions 47, 47 of the joints 44, 45 are provided on the sides (front and rear faces) 43, respectively, of the canister 40.

Each of the mounting portions 47 has: a through hole 47a into which a tip 45c of the first pipe portion 45a of the joint 45 is rotatably inserted; a socket portion 47b that rotatably receives the flange portion 45f of the joint 45; and a retainer holder 47c that holds and fixes the retainer 46.

The retainer holder 47c is a framework integrally formed on the side of the canister 40, and an upper frame 47d and a lower frame 47e of the retainer holder 47c are each provided with a through hole 47g (see Part (c) of FIG. 4) in the form of a slit, into which the leg portion 46b of the retainer 46 is inserted.

The joint 45 is rotatably mounted to the canister 40: by fitting the tip 45c and the flange portion 45f of the joint 45 into the through hole 47a and the receiving portion 47b of the mounting portion 47; thereafter, by inserting the leg portions 46b of the retainer 46 into the through holes 47g, 47g of the retainer holder 47c in such a manner that a gap between the hook portions 46c at the tips of the leg portions 46b becomes narrow; and then by engaging the hook portions 46c with the lower frame 47e of the retainer holder 47c.

Incidentally, when the hook portions 46c are engaged with the lower frame 47e of the retainer holder 47c by inserting the leg portions 46b of the retainer 46 into the through holes 47g, 47g of the retainer holder 47c, the leg portions 46b, 46b engage with the flange portion 45f of the joint 45 to prevent the joint 45 from disengaging from the canister 40, and also, the flange portion 45f is connected to the through hole 47a and is brought into intimate contact therewith.

The connection pipes 31, 32 are respectively connected to the joints 44, 45, as later described.

As shown in FIG. 3, the holding member 60 includes both the annular portion 61, that surrounds the cylindrical body portion 41 of the canister 40, and the fixing portion 63 that is provided to be fixed to the vehicle body. The annular portion 61 is provided with the holes 62 for positioning the canister 40 at the predetermined position, the holes 62 being engageable with the projections 42 provided in the periphery of the cylindrical body portion 41 of the canister 40.

In the embodiment, twelve holes 62 are provided, spaced at a 30 degree pitch, along the annular portion 61.

The holding member 60 can be formed as a metallic band.

The mounting of the canister 40 to the vehicle body (incidentally, since the vehicle body is shown as the seat rails 15 in FIG. 3, the vehicle body will hereinafter be sometimes described as indicated by the reference numeral 15) can be accomplished, for example, in the following manner.

The holes 62 in the annular portion 61 are selected, and the holding member 60 is attached to the canister 40 in such a manner that the holes 62 are engaged with the projections 42 of the canister 40, in order that the canister 40 may be in a proper posture when the fixing portion 63 is fixed to the vehicle body 15.

After that, the canister 40 is fixed in place by attaching the fixing portion 63 to the vehicle body 15 by a fixing member 64, such as a bolt. As shown in FIG. 2, a suitable threaded boss 30 is provided on the vehicle body 15 to engagingly receive the fixing member 64. The boss 30 may be welded on, or otherwise firmly fixed in place on the vehicle body 15 in a known manner.

In FIG. 3B, a first holding member 60 is shown by only one solid line; however, it is desirable that a pair of holding members 60 (see FIG. 1) be used to hold the canister 40, as shown also by a phantom line.

Note that the number of projections 42 provided on the canister 40 may be only one, or alternatively, may be two or more arranged in a circumferential direction. The provision of the single projection 42 has the advantage of simplifying the shape of the canister 40 in which the projection 42 is provided. Meanwhile, the provision of the multiple projections 42 enables the firm fixing and positioning of the canister 40 and thus suppression of wobbling of the canister due to vibrations, since multiple engagement points for positioning the canister 40 at the predetermined position lie on the periphery of the cylindrical body portion 41 of the canister 40.

In the depicted embodiment, the number of projections 42 provided in the canister 40 is two in the circumferential direction, which in turn enables the simplification of the shape of the canister 40 as compared to the provision of three or more projections 42, and also enables the firm fixing and positioning of the canister 40 and thus the suppression of wobbling of the canister 40 due to vibrations as compared to the provision of only one projection 42.

As shown in FIG. 1, the joint 44 that forms the inlet of the canister 40 is connected by piping 31 (for example, a hose) to the ventilation pipe 26a for exhausting air, containing vaporized fuel from the fuel tank 26, out of the fuel tank, whereas the joint 45 that forms the outlet of the canister 40 is connected to the air cleaner 27c by the piping 32.

At this time, the piping 31 on one end is fixed to the vehicle body 15 by a fixture 33 thereby to position joint 44 on the end in view of a direction of rotation. Although not shown, the piping 32 on the other end may be fixed to the vehicle body 15 by the same fixture thereby to position the joint 45 on the other end in view of a direction of rotation.

Figure 7A:
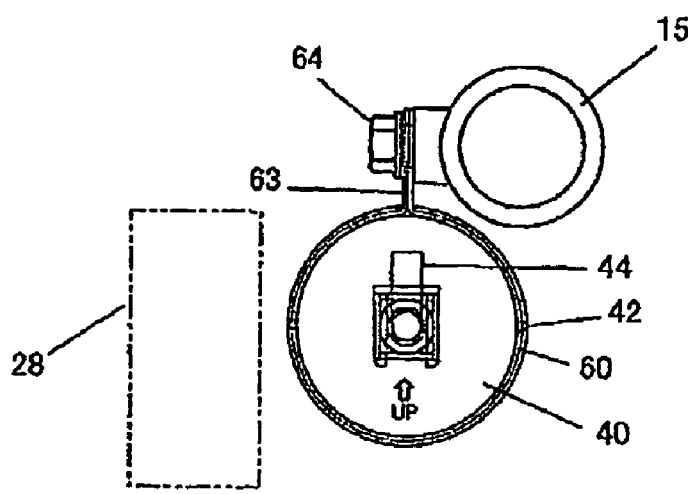
FIGS. 7A, 7B, and 7C are views showing examples of modes of mounting of the canister to a vehicle body by the canister holding structure.
Figure 7B:
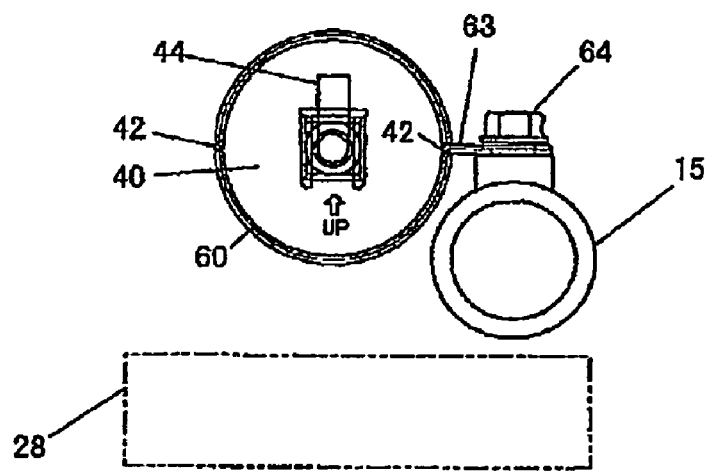
Figure 7C:
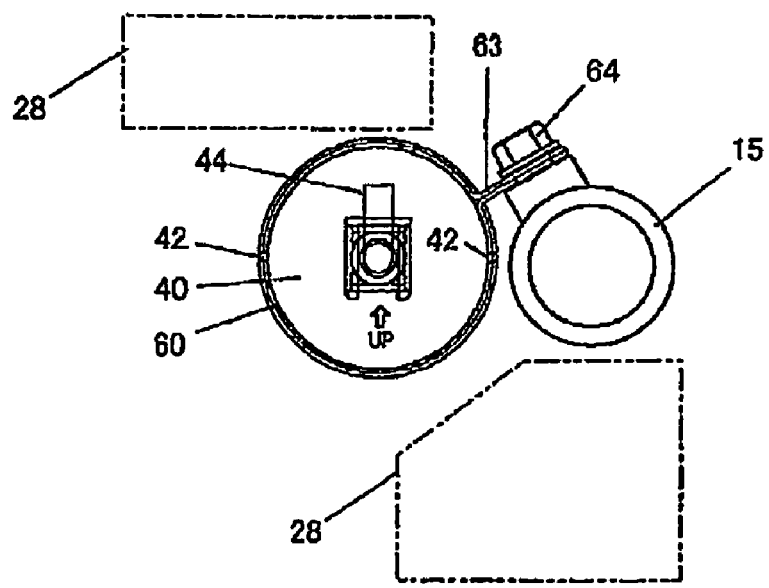

FIGS. 7A-7C are views showing examples of modes in which the canister 40 is mounted to the vehicle body 15 according to the canister holding structure as mentioned above, corresponding to a view, with parts omitted, taken in the direction of the arrow 11 of FIG. 1.

The mounding mode illustrated in FIG. 7A shows a state where the canister 40 is suspended by use of the holding member 60 with respect to the vehicle body frame 15 as the mounting portion. This mode is suitable for a situation where an obstacle 28 such as an auxiliary machine (for example, a battery) is disposed at the side of the vehicle body frame 15. In this respect, the same goes for a mounting mode shown in FIG. 2.

The mounding mode illustrated in FIG. 7B shows a state where the canister 40 is held by use of the holding member 60 in overhanging relation with respect to the vehicle body frame 15 as the mounting portion. This mode is suitable for a situation where the obstacle 28 is disposed above or below the vehicle body frame 15. Incidentally, although FIG. 7B illustrates the situation where the obstacle 28 is disposed below the vehicle body frame 15, this mounting mode is likewise effective for the situation where the obstacle 28 is disposed above the vehicle body frame 15.

The mounding mode illustrated in FIG. 7C shows a state where the canister 40 is held by use of the fixing portion 63 of the holding member 60 extending obliquely downwardly with respect to the vehicle body frame 15 as the mounting portion. This mode is suitable for a situation where the obstacle 28 is disposed above or below the vehicle body frame 15 or at the right or left of the vehicle body frame 15 and thus, obliquely downward (or obliquely upward) space alone is available. Incidentally, although FIG. 7C illustrates the situation where the obstacles 28 are disposed leftward above and below the vehicle body frame 15, respectively, the canister 40 can be held obliquely rightward above the vehicle body frame 15 in the situation where the obstacles 28 are disposed above and rightward below the vehicle body frame 15, respectively. In this instance, the canister 40 is held symmetrically with respect to a position shown in FIG. 7C with respect to the center of the vehicle body frame 15.

Incidentally, FIGS. 7A-7C show representative examples of mounting modes; however, in the embodiment, the annular portion 61 of the holding member 60 is provided with the twelve holes 62 at a 30 degree pitch, and thus, the projection 42 can be selectively engaged with one of the holes 62 thereby to adjust a mounting position accordingly.

According to the canister holding structure as mentioned above, the following operations and effects can be achieved.

(a) The canister 40 holding structure includes a holding member 60 for holding the canister 40, the holding member 60 including an annular portion 61 which surrounds the circumference of a cylindrical body portion 41 of the canister 40 and a fixing portion 63 which is to be fixed to the vehicle body; and positioning structure for positioning the canister 40 at a predetermined position, the positioning structure provided to the annular portion 61 and the canister 40. The positioning structure is configured of: a projection 42 provided on a periphery of the cylindrical body portion 41 of the canister 40; and multiple holes 62 provided in the annular portion 61 of the holding member 60, each of the multiple holes 62 being engageable with the projection 42. Thus, the positioning of the canister 40 at the predetermined position can be accomplished by selectively engaging the multiple holes 62 provided in the annular portion 61 of the holding member 60 with the projection 42 provided on the periphery of the cylindrical body portion 41 of the canister 40, and the mounting of the canister 40 to the vehicle body in a predetermined posture can be accomplished by fixing the fixing portion 63 of the holding member 60 to the vehicle body 15.

According to the canister holding structure, then, the positioning structure includes the projection 42 provided on the periphery of the cylindrical body portion of the canister 40, and the multiple holes 62 each engageable with the projection 42, provided in the annular portion 61 of the holding member 60. This enables size reduction of the projection 42 and also enables an increase in the number of holes 62 provided in the annular portion 61.

According to the canister holding structure, therefore, both the size reduction of the canister 40 and the enhancement of the degree of flexibility in mounting can be achieved.

(b) Also, the projection 42 provided on the canister 40 includes two projections that are provided circumferentially. This enables simplification of the shape of the canister 40 as compared to the provision of three or more projections 42, and also enables the firm fixing and positioning of the canister 40 as compared to the provision of only one projection 42, thus enabling the suppression of wobbling of the canister due to vibrations.

(c) The joint 44 (or 45) formed of the bent pipe, which the piping 31 (or 32) is connected to, is rotatably provided at an end of the canister 40 in the axial direction. This enables rotation of the joint according to the direction of the piping 31 (or 32) that is connected to the joint 44 (or 45).

Therefore, this also eliminates the need for the preparation of canisters different in direction of bending of the joint formed of the bent pipe, according to the types of vehicles having different piping directions, thus achieving a further improvement in general versatility.

(d) Also, the joint 44 (or 45) is provided with the flange portion 45f that is connected to the through hole 47a provided in the canister 40. The canister 40 is provided with the retainer 46 that engages the flange portion 45f so that the flange portion 45f can come into intimate contact with the through hole 47a, and the retainer holder 47c that fixedly holds the retainer 46. This enables the use of a simple structure for rotatable connection of the joint 44 (or 45) to the canister 40.

(e) Positioning of the joint 44 (or 45) with respect to a direction of its rotation is accomplished by linking the piping 31 (or 32) to the joint 44 (or 45), and fixing the piping 31 (or 32) to the vehicle body 15. This eliminates the need for a member designed specifically for fixing the joint 44 (or 45) with respect to the direction of rotation.

Other Embodiments

FIG. 8A is a side view, with parts omitted (in which the holding member 60 on the left side is shown as viewed in cross section taken along the line a-a of Part (c) of FIG. 8; a cross sectional view, with parts omitted, taken along the line b-b of Part (a) of FIG. 8; and a side view of Part (a) of FIG. 8, with parts omitted, respectively, showing another embodiment of the holding structure for the canister. In FIG. 8, the same or corresponding parts as or to those of the above-mentioned embodiment are indicated by the same reference numerals.

The main point of difference between the embodiment shown in FIG. 8 and the above-mentioned embodiment is that the positioning structure of the annular portion 61 of the holding member 60 and the canister 40 includes multiple recesses 48 provided in the periphery of the cylindrical body portion 41 of the canister 40, and a projection 65 engageable with any one of the recesses 48, provided on the annular portion 61 of the holding member 60.

This embodiment can likewise achieve the above-mentioned functional effects (a) to (e).

In this embodiment, a large-diameter portion 41a is provided on the periphery of the cylindrical body portion 41 of the canister 40. The large-diameter portion 41a is provided with the recesses 48, and the annular portion 61 of the holding member 60 is provided with a stopper portion 66 that engages an end face portion 41b of the large-diameter portion 41a in its axial direction thereby to restrict relative movement between the canister 40 and the holding member 60 in the axial direction (or in a direction from side to side in Part (a) of FIG. 8, when the projection 65 provided on the annular portion 61 engages with one of the recesses 48.

This configuration eliminates the need for additional restricting structure for restricting the relative movement between the canister 40 and the holding member 60 in the axial direction, besides the large-diameter portion 41a provided with the recesses 48 that form the positioning structure, and the annular portion 61.

Therefore, restriction of the relative movement between the canister 40 and the holding member 60 in the axial direction can be achieved without having to increase the number of components.

The large-diameter portion 41a is provided in a central portion of the cylindrical body portion 41 of the canister in the axial direction, and the recesses 48 are provided in both end portions of the large-diameter portion 41a in the axial direction. In other words, outer ends 48a of the recesses 48 in the axial direction are open.

Therefore, the attachment of the holding member 60 to the canister 40 can be accomplished by fitting the holding member 60 into the cylindrical body portion 41 of the canister 40, from both sides in the axial direction, in the direction of arrow X1 of Part (a) of FIG. 8, in such a manner that the projection 65 of the holding member 60 is fitted in the recess (or is inserted into the recess 48 in the direction of the arrow X1). At this time, the holding member 60 is moved for the attachment until the stopper portion 66 engages against the end face portion 41b of the large-diameter portion 41a.

Note that the recess 48 provided in the canister 40 (or the projection 65 provided on the holding member 60) may be such a single recess (or projection) that is provided circumferentially, or may be such two or more recesses (or projections) that are provided circumferentially. The provision of the single recess (or projection) has the advantage of enabling simplification of the shape of the canister 40 (or the holding member 60) provided with the recess 48. Meanwhile, the provision of the multiple recesses (or projections) leads to the presence of multiple points of engagement for positioning the canister 40 at the predetermined position, on the periphery of the cylindrical body portion 41 of the canister 40, thus enabling the firm fixing and positioning of the canister 40 and hence the suppression of wobbling of the canister 40 due to vibrations.

In this embodiment, the twelve recesses 48 provided in the canister 40 and the twelve projections 65 provided on the holding member 60 are provided extending around in a circumferential direction and spaced at a 30 degree pitch. Therefore, this enables the firm fixing and positioning of the canister 40 and hence the suppression of wobbling of the canister 40 due to vibrations.

The annular portion 61 and the fixing portion 63 may be integrally formed by a synthetic resin, thereby to form the holding member 60.

Parts (a) and (b) of FIG. 9 are a side view, with parts omitted (in which the holding member 60 on the left side is shown as viewed in cross section taken along the line a-a of Part (b) of FIG. 9, and a side view of Part (a) of FIG. 9, with parts omitted, respectively, showing still another embodiment of the holding structure for the canister. In FIG. 9, the same or corresponding parts as or to those of the above-mentioned embodiments are indicated by the same reference numerals.

The point of difference between the embodiment shown in FIG. 9 and the embodiment shown in FIG. 8 is that the holding member 60 is configured to cover substantially half a circumferential surface of the cylindrical body portion 41 of the canister 40 with respect to the axial direction, and a pair of holding members 60 are attached to the cylindrical body portion 41 of the canister 40 on both sides in the axial direction. In other respects, there is no difference.

In this embodiment, the annular portion 61 of the holding member 60 has a cylindrical shape with the stopper portion 66 stepped, and its outer end has formed thereon a ring-shaped disc portion 67 that abuts on the side 43 of the canister 40.

This embodiment eliminates the need for additional restricting structure for restricting the relative movement between the canister 40 and the holding member 60 in the axial direction, besides the large-diameter portion 41a provided with the recesses 48 that form the positioning structure, and the annular portion 61. At the same time, this embodiment also enables using the annular portion 61 to protect the circumferential surface of the cylindrical body portion of the canister 40.

FIG. 10 is a view showing a modified example of the retainer and the retainer holder. Specifically, Part (a) of FIG. 10 is a front view of the retainer; Part (b), a side view of the retainer; Part (c), a front view of the retainer holder; Part (d), a sectional side view thereof; Part (e), a front view of the retainer holder with the joint and the retainer mounted; and Part (f), a sectional side view thereof. In FIG. 10, the same or corresponding members or parts as or to those of the above-mentioned embodiments are indicated by the same reference numerals.

The retainer 46 shown in Part (a) of FIG. 10 is a member made of a material capable of elastic deformation, having a square U-shape as seen in front view (such for example as a metallic spring member or a plastic spring member), and the retainer 46 has the thumb portion 46a, and the pair of leg portions 46b integrally suspended from the thumb portion 46a. The tip of the leg portion 46b is not provided with the hook portion.

Meanwhile, the retainer holder 47c has a pair of hook portions 47f and 47f integrally formed on the side of the canister 40, and an anti-disengagement portion 47k likewise integrally formed on the side of the canister 40.

The hook portion 47f is linked only at its base 47h integrally with the side 43 of the canister 40, and clearance C is formed between parts other than the base 47h and the side 43 of the canister 40. Thus, the hook portion 47f is deformable in the directions of arrows a and b of Part (d) of FIG. 10, centered at the base 47h.

An engagement portion 47i engageable with the tip of the leg portion 46b of the retainer 46 is formed on the base 47h of the hook portion 47f, and an engagement portion 47j engageable with the top of the leg portion 46b of the retainer 46 is formed at the tip of the hook portion 47f.

As shown in Parts (e) and (f) of FIG. 10, the joint 45 is rotatably mounted to the canister 40: by fitting the tip 45c and the flange portion 45f of the joint 45 into the through hole 47a and the receiving portion 47b of the mounting portion 47; thereafter, by inserting the leg portions 46b of the retainer 46 between the hook portions 47f, 47f, while deforming the pair of hook portions 47f in the direction of the arrow a; and then fitting the thumb portion 46a of the retainer 46 between the tip (or upper end) of the hook portion 47f and the anti-disengagement portion 47k, while engaging the tips of the leg portions 46b with the engagement portions 47i of the hook portions 47f. When the thumb portion 46a of the retainer 46 is fitted between the upper end of the hook portion 47f and the anti-disengagement portion 47k, the hook portion 47f rotates by its own elasticity in the direction of the arrow b and thereby returns to the illustrated position.

Incidentally, the attachment of the leg portions 46b of the retainer 46 to the retainer holder 47c in the manner as above mentioned leads to the engagement of the leg portions 46b with the engagement portions 47i and 47j of the hook portions 47f, and also leads to the contact of the thumb portion 46a against the anti-disengagement portion 47k, thereby preventing the retainer 46 from disengaging from the retainer holder 47c. Then, the engagement leg portions 46b and 46b engage with the flange portion 45f of the joint 45 thereby to prevent the joint 45 from disengaging from the canister 40. Moreover, the flange portion 45f is connected to the through hole 47a and is brought into intimate contact therewith.

Parts (a) and (b) of FIG. 11 are a front view, with parts omitted, and a side view, with parts omitted, respectively, showing still another embodiment of the holding structure for the canister. Parts (a), (b) and (c) of FIG. 12 are a front view, a side view, and a plan view of Part (b) of FIG. 12, respectively, showing the main body of the canister 40. In these drawings, the same or corresponding parts as or to those of the embodiment shown in FIG. 3 and FIG. 4 are indicated by the same reference numerals. The point of difference between the embodiment shown in FIG. 11 and FIG. 12 and the embodiment shown in FIG. 3 and FIG. 4 is that the joints 44, 45, two each, are provided. In other respects, there is no difference.

This embodiment can likewise achieve the above-mentioned functional effects (a) to (e).

Further, according to this embodiment, the provision of the joints 44, 45, two each, enables multiplication of the flow of gas through the canister 40. Specifically, gas flowing from the joint 44 on one end into the canister 40 is split into two parts in the canister 40 toward the two joints 45, and gas flowing from the joint 44 on the other end into the canister 40 is likewise split into two parts in the canister 40 toward the two joints 45.

Therefore, this enables effective use of the function of the canister 40.

While the embodiments of the present invention have been described above, it is to be understood that the invention is not limited to the above embodiments, and modifications may be appropriately made thereto within the spirit and scope of the invention.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. In a motorcycle having a vehicle body frame comprising a tubular frame member, the improvement comprising a combination of a cylindrical canister and canister holding structure for mounting the canister to a vehicle body such that a central axis of the cylindrical canister extends in a direction other than a direction perpendicular to a ground surface, the canister holding structure comprising:
    a holding member for holding the canister, the holding member including an annular portion for placement substantially surrounding a cylindrical body portion of the canister, and a fixing portion configured for attachment to the vehicle body; and
    a positioning structure for positioning the canister at a predetermined position in the holding member, the positioning structure provided to the annular portion and the canister, wherein the positioning structure comprises:
        at least one projection provided on a periphery of the cylindrical body portion of the canister; and
        a plurality of holes formed in the annular portion of the holding member, each of the holes being engageable with the projection.

2. A canister holding structure for mounting a cylindrical canister to a vehicle body such that a central axis of the cylindrical canister extends in a direction other than a direction perpendicular to a ground surface, the canister holding structure comprising:
    a holding member for holding the canister, the holding member including an annular portion for placement substantially surrounding a cylindrical body portion of the canister, and a fixing portion configured for attachment to the vehicle body; and
    a positioning structure for positioning the canister at a predetermined position in the holding member, the positioning structure provided to the annular portion and the canister, wherein the positioning structure comprises:
        a plurality of recesses provided in a periphery of the cylindrical body portion of the canister; and
        at least one projection provided on the annular portion of the holding member and engageable with any one of the recesses.

3. The canister holding structure according to claim 2, wherein
    a large-diameter portion is provided on the periphery of the cylindrical body portion of the canister,
    the recesses are provided to the large-diameter portion, and
    a stopper portion is provided to the annular portion of the holding member, the stopper portion engaging with an end face portion of the large-diameter portion in its axial direction, thereby to restrict relative movement between the canister and the holding member in the axial direction, when the projection provided on the annular portion engages one of the recesses.

4. The canister holding structure according to claim 3, wherein
    the large-diameter portion is provided in a central portion of the cylindrical body portion of the canister in the axial direction,
    the recesses are provided in both end portions of the large-diameter portion in the axial direction, and
    a pair of holding members that cover substantially half a circumferential surface of the cylindrical body portion with respect to the axial direction are attached to the cylindrical body portion on both sides in the axial direction.

5. The canister holding structure according to claim 4, wherein said at least one projection comprises a plurality of projections that are provided circumferentially.

6. The canister holding structure according to claim 4, wherein a joint, comprising a bent pipe to which an auxiliary piping is connected, is rotatably provided at an end of the canister in the axial direction.

7. The canister holding structure according to claim 3, wherein said at least one projection comprises a single projection that is provided circumferentially.

8. The canister holding structure according to claim 3, wherein said at least one projection comprises a plurality of projections that are provided circumferentially.

9. The canister holding structure according to claim 3, wherein a joint, comprising a bent pipe to which an auxiliary piping is connected, is rotatably provided at an end of the canister in the axial direction.

10. The canister holding structure according to claim 2, wherein said at least one projection comprises a single projection that is provided circumferentially.

11. The canister holding structure according to claim 2, wherein said at least one projection comprises a plurality of projections that are provided circumferentially.

12. The canister holding structure according to claim 2, wherein a joint, comprising a bent pipe to which an auxiliary piping is connected, is rotatably provided at an end of the canister in the axial direction.

13. A canister holding structure for mounting a cylindrical canister to a vehicle body such that a central axis of the cylindrical canister extends in a direction other than a direction perpendicular to a ground surface, the canister holding structure comprising:
    a holding member for holding the canister, the holding member including an annular portion for placement substantially surrounding a cylindrical body portion of the canister, and a fixing portion configured for attachment to the vehicle body; and
    a positioning structure for positioning the canister at a predetermined position in the holding member, the positioning structure provided to the annular portion and the canister, wherein the positioning structure comprises:
- at least one projection provided on a periphery of the cylindrical body portion of the canister; and
- a plurality of holes formed in the annular portion of the holding member, each of the holes being engageable with the projection.

14. The canister holding structure according to claim 13, wherein said at least one projection comprises a single projection that is provided circumferentially.

15. The canister holding structure according to claim 13, wherein said at least one projection comprises a plurality of projections that are provided circumferentially.

16. The canister holding structure according to claim 13, wherein a joint, comprising a bent pipe to which an auxiliary piping is connected, is rotatably provided at an end of the canister in the axial direction.

17. The canister holding structure according to claim 16, wherein the joint is provided with a flange portion that is connected to a through hole provided in the canister body, and further comprising a retainer that engages with the flange portion so that the flange portion comes into intimate contact with the through hole; and a retainer holder that fixedly holds the retainer.

18. The canister holding structure according to any claim 16, wherein positioning of the joint with respect to a direction of its rotation is accomplished by coupling the auxiliary piping to the joint, and by fixing the auxiliary piping to the vehicle body.

19. In a motorcycle having a vehicle body frame comprising a tubular frame member, the improvement comprising a combination of a cylindrical canister and canister holding structure for mounting the canister to a vehicle body such that a central axis of the cylindrical canister extends in a direction other than a direction perpendicular to a ground surface, the canister holding structure comprising:
- a holding member for holding the canister, the holding member including an annular portion for placement substantially surrounding a cylindrical body portion of the canister, and a fixing portion configured for attachment to the vehicle body; and
- a positioning structure for positioning the canister at a predetermined position in the holding member, the positioning structure provided to the annular portion and the canister, wherein the positioning structure comprises:
  - a plurality of recesses provided in a periphery of the cylindrical body portion of the canister; and
  - at least one projection provided on the annular portion of the holding member and engageable with any one of the recesses.

20. The motorcycle with the canister holding structure according to claim 19, wherein
- a large-diameter portion is provided on the periphery of the cylindrical body portion of the canister,
- the recesses are provided to the large-diameter portion, and
- a stopper portion is provided to the annular portion of the holding member, the stopper portion engaging with an end face portion of the large-diameter portion in its axial direction, thereby to restrict relative movement between the canister and the holding member in the axial direction, when the projection provided on the annular portion engages one of the recesses.

* * * * *